UNITED STATES PATENT OFFICE.

WILHELM HASENBACH, OF MANNHEIM, GERMANY.

PROCESS OF MAKING INFUSIBLE SODIUM SULFID.

No. 914,271.  Specification of Letters Patent.  Patented March 2, 1909.

Application filed November 1, 1907. Serial No. 400,207.

*To all whom it may concern:*

Be it known that I, WILHELM HASENBACH, of Mannheim, Germany, a subject of the German Emperor, have invented certain new and useful Improvements in Processes of Making Infusible Sodium Sulfid, of which the following is a specification.

The object of this invention is a process of manufacturing from sodium sulfate and carbon a pulverulent reduction product which is infusible even at very high temperatures.

The process is as follows: A finely ground mixture is made of sodium sulfate and carbonaceous matter (such as close-burning coal, coke and the like) in the proportion of about one part by weight of carbon to about one and one-half parts sodium sulfate, that is containing about twice as much carbon as is required for the reaction if according to the formula

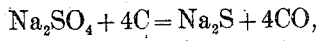

the oxygen of the sulfate is to be liberated as carbon monoxid (*i. e.* 100 parts by weight of sulfate and about 80 parts of carbonaceous matter corresponding to about 67.6 parts of carbon). This mixture is heated in a muffle furnace or coking oven, when a pulverulent reduction product (a mixture of sodium sulfid and carbon) is obtained that does not melt or sinter at about 1000° C. and does not lose its pulverulent condition, and does not attack the vessel or the furnace in which the reduction is effected. However for obtaining this heretofore unprecedented result an ordinary fine-grinding of the said mixture of sodium sulfate and coal is not sufficient, but the said mixture must be so ground down that the single particles of the two components are bedded together as near as possible, that is the reduction must be continued until it is found that (by taking an assay or trial portion of the ground mixture and heating the same to 800 to 1000° C. in a hermetically closed muffle,) the material does not lose its pulverulent condition. The required fineness is then attained.

Material which will pass through a sieve having less than five hundred meshes per square centimeter is not fine enough but in practice I have found that the material when ground so as to pass through a sieve having six hundred and seventy meshes to the square centimeter will be effective.

As the mixture of sodium sulfid and carbon retains its pulverulent condition during manufacture, and does not melt or sinter the product has the advantage that it can flow readily, to and from the reaction vessels or from place to place, an advantage of great industrial importance from the manufacturing point of view.

I claim:

1. The herein described method of manufacturing a pulverulent reduction product from sodium-sulfate and carbon, consisting in first mixing sodium sulfate and carbonaceous matter, finely ground as specified, in such proportions that the quantity of carbon present is as much as one part by weight of carbon to about one and-one-half parts of sodium sulfate, then so grinding the mixture that a test portion heated to 1000° C. in a hermetically closed vessel will retain its pulverulent condition, and then heating the whole bulk or charge of the mixture to 700 to 800° C.

2. The herein described method of manufacturing a pulverulent reduction product from sodium-sulfate and carbon, consisting in first mixing sodium-sulfate and carbonaceous matter, finely ground as specified, in such proportions that the quantity of carbon present is in the proportion of about one part by weight of carbon to about one and-one-half parts of sodium sulfate, then so grinding the mixture that a test portion heated to 1000° C. in a hermetically closed vessel retains its pulverulent condition, then heating the whole bulk or charge while hermetically sealed to 700 to 800° C., producing a pulverulent product.

In testimony whereof I have signed my name to this specification in the presence of two subscribing witnesses.

WILHELM HASENBACH.

Witnesses:
 OSCAR SCHARLART,
 JOS. H. LEUTE.